United States Patent
Galles (10) Patent No.: US 7,257,723 B2
(45) Date of Patent: Aug. 14, 2007

(54) REDUCING POWER CONSUMPTION IN EMBEDDED SYSTEMS BY CONTROLLING VOLTAGE BASED ON SYSTEM STATE AND PARTITION DESIGNATION

(75) Inventor: Mike Galles, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 0 days.

(21) Appl. No.: 11/243,946

(22) Filed: Oct. 4, 2005

(65) Prior Publication Data

US 2006/0156045 A1    Jul. 13, 2006

Related U.S. Application Data

(60) Provisional application No. 60/643,095, filed on Jan. 7, 2005.

(51) Int. Cl.
*G06F 1/32* (2006.01)

(52) U.S. Cl. .................................. 713/321; 713/401

(58) Field of Classification Search ...................... None
See application file for complete search history.

(56) References Cited

U.S. PATENT DOCUMENTS

| | | | | |
|---|---|---|---|---|
| 5,752,046 | A * | 5/1998 | Oprescu et al. | 713/300 |
| 5,870,404 | A * | 2/1999 | Ferraiolo et al. | 714/700 |
| 5,940,785 | A * | 8/1999 | Georgiou et al. | 702/132 |
| 6,345,362 | B1 * | 2/2002 | Bertin et al. | 713/300 |
| 6,625,737 | B1 * | 9/2003 | Kissell | 713/300 |
| 6,681,335 | B1 * | 1/2004 | Rice et al. | 713/320 |
| 6,986,069 | B2 * | 1/2006 | Oehler et al. | 713/320 |
| 2004/0090808 | A1 | 5/2004 | Meguro | |

* cited by examiner

*Primary Examiner*—Thuan Du
(74) *Attorney, Agent, or Firm*—Bever, Hoffman & Harms, LLP; Jeanette S. Harms (57) ABSTRACT

An embedded system optimally operates with minimal power consumption without sacrificing performance. Power consumption can be reduced by independently and dynamically controlling multiple power partitions, wherein components within a partition can have the same power profile. States of operation can be programmably defined in a table and enforced using hardware. Voltages in the table can be dynamically updated during a runtime of the system using a timing feedback module, which is connected to a critical path in a partition. The timing feedback module can output a vector that indicates the timing margin for that critical path. Using this timing margin, software can increase or decrease the voltage to optimize power consumption of that partition.

10 Claims, 8 Drawing Sheets

| State | Radio Partition 101 | System Control Partition 102 | Central Processing Partition 103 | System Interface Partition 104 |
|---|---|---|---|---|
| OFF | 0 V<br>0 MHz | 1.0 V<br>32 kHz | 0 V<br>0 MHz | 0 V<br>0 MHz |
| SDIO_OFF | 0 V<br>0 MHz | 1.0 V<br>32 kHz | 0 V<br>0 MHz | 0 V<br>0 MHz |
| DEEP SLEEP | 0.8 V<br>0 MHz | 1.0 V<br>32 kHz | 0.8 V<br>0 MHz | 0.8 V<br>0 MHz |
| LIGHT SLEEP | 1.0 V<br>0 MHz | 1.0 V<br>32 kHz | 1.0 V<br>0 MHz | 1.0 V<br>0 MHz |
| WAKEUP | 1.0 V<br>0 MHz | 1.4 V<br>32 kHz | 1.0 V<br>0 MHz | 1.6 V<br>0 MHz |
| APPLICATION | 1.0 V<br>0 MHz | 1.4 V<br>32 kHz | 1.2/1.4/1.8 V<br>0/40/120 MHz | 1.6 V<br>40 MHz |
| ON | 1.8 V<br>160 MHz | 1.4 V<br>32 kHz | 1.2/1.4/1.8 V<br>0/40/120 MHz | 1.6 V<br>40 MHz |

Power Profile Table 300

REDUCING POWER CONSUMPTION IN EMBEDDED SYSTEMS BY CONTROLLING VOLTAGE BASED ON SYSTEM STATE AND PARTITION DESIGNATION

RELATED APPLICATIONS

This application claims priority of U.S. Provisional Patent Application 60/643,095, entitled "Reducing Power Consumption In Embedded Systems Via Controlling Voltage And Frequency Based On System State" filed Jan. 7, 2005.

BACKGROUND OF THE INVENTION

1. Field of the Invention

The present invention relates to an embedded system having designated power partitions, wherein the voltage of each partition in each state can be independently controlled, thereby facilitating power reduction in the embedded system.

2. Discussion of the Related Art

The power consumption of a system is related to its capacitance, clock frequency (frequency), and power supply voltage (voltage). Specifically, the power consumption is proportional to its capacitance and frequency, and the square of its voltage (i.e. dynamic power=$C*V^2*f$). Changing the capacitance is process dependent (i.e. a product of manufacturing) and thus is not controllable by the end users of the system. Therefore, end users of the system can attempt to change the frequency and the voltage to reduce overall power consumption.

For example, end users can change the frequency and the voltage based on the functions required by the system. Generally, the higher the frequency needed, the higher the voltage needed to sustain that frequency. It logically follows that the lower the frequency needed, the lower the voltage needed to sustain that frequency. A divided digital clock can be used to change the frequency substantially simultaneously with a command. However, a predetermined period of time is needed to switch the voltage. Therefore, a control circuit can be used to issue a voltage change command before the frequency change command, thereby ensuring an optimal frequency and voltage for the system at any point in time. U.S. Published Patent Application 2004/0090808, entitled "Power-Supply Voltage Frequency Control Circuit", published on May 13, 2004, describes such a control circuit.

Typically, software is used to determine when to make a voltage and frequency change. Unfortunately, because a number of applications may be running on the operating system at any one time wherein each application may have different requirements, software may not know the optimal time to make the voltage and frequency change. Therefore, taking into account a worst-case scenario, software may opt to use a high voltage and frequency for the system, thereby undesirably increasing power consumption.

An increasing number of integrated circuits (ICs) include a set of functionalities tailored for a specific application. An exemplary application could be to implement a device in a wireless local area network (WLAN). These types of ICs are referred to in the industry as "embedded systems". These functionalities, although supporting a specific application, may require significantly different voltages and/or frequencies. Therefore, a need arises for a system and method of providing optimal power profiles to an embedded system.

SUMMARY OF THE INVENTION

An embedded system optimally operates with minimal power consumption without sacrificing performance. In accordance with one aspect of the invention, power consumption can be reduced by independently and dynamically controlling multiple power partitions.

To create these power partitions, an integrated circuit (IC) design can be divided into regions having different functionalities, wherein components within a partition can have the same power profile. A power profile for a partition during a particular state (i.e. mode of operation) can include a voltage, a frequency, or other designations affecting power. In one embodiment, the power profile can include a set of voltages and/or frequencies. Exemplary power partitions may include radio, system control, central processing, and system interface partitions.

States of operation can be programmably defined for the system. Exemplary states may include OFF, SDIO_OFF, DEEP SLEEP, LIGHT SLEEP, WAKEUP, APPLICATION, and ON. Notably, the power profile of a partition may vary depending on its state. In one embodiment, at system initialization time, software can provide the power profiles for the partitions based on the defined states to a power profile table. These power profiles can depend on system usage, protocol requirements, and calibration information. In one embodiment, hardware can then enforce the power profiles defined in the table.

Advantageously, the voltages in the power profile table can be dynamically updated during a runtime of the embedded system. In accordance with one aspect of the invention, a timing feedback module can facilitate this dynamic update. A timing feedback module can include a time delay circuit coupled to a critical path of a power partition, a compare circuit, and storage devices. The compare circuit can compare an output signal of the critical path to propagated signals on the time delay circuit (i.e. for stages of the time delay circuit). The storage devices can store the outputs of the compare circuit. The combined outputs of the stages of the time delay circuit can form a timing margin vector.

In one embodiment, the compare circuit can include XOR gates, OR gates, and flip-flops. Each XOR gate can receive the output signal of the critical path and one of the propagated signals (i.e. associated with one stage of the time delay circuit). Each OR gate can receive an output of an XOR gate. Each flip-flop can receive an output of an OR gate and provide an output to another input terminal of the OR gate. In this configuration, when an XOR gate detects a "miscompare" condition (i.e. when the output signal and the compared propagated signal are different logic states, such as "0" and "1"), then its associated flip-flop can latch that miscompare designation (in this case, a logic one) until cleared.

The outputs of the flip-flops form a timing margin vector. In the timing feedback module, the longer the delay, the greater the probability that a miscompare condition will occur. Therefore, a typical pattern for the timing margin vector transitions from a logic zero to a logic one (e.g. 00111111, 00000001, 01111111, 00001111, etc.). A small margin, i.e. 01111111, indicates a high probability that a timing error can occur using the current power profile. In this case, the voltage for that partition in that state can be increased. In contrast, a large margin, i.e. 00000001, indicates a low probability that a timing error can occur using the current power profile. In this case, the voltage for that partition in that state can be decreased.

In one embodiment, to increase the accuracy of a timing margin for a partition, multiple, critical paths in the partition can be selected. In this case, a timing margin vector for each critical path can be generated using an associated timing feedback module. A worst-case timing margin vector (also called a combined result vector) can be determined based on the timing margin vectors generated by the multiple timing feedback modules.

For example, determining the worst-case timing margin vector can include comparing the timing margin vector bits associated with a same stage of the time delay circuits, providing a first logic value (e.g. a "0") to the worst-case timing margin vector if the bits are identical logic values, and providing a second logic value (e.g. a "1") to the worst-case timing margin vector if the bits are not identical logic values. In one embodiment, generating the timing margin vector and determining the worst-case timing margin vector can be performed at least once or periodically during run time of the embedded system.

In one embodiment, a predetermined value in the worst-case timing margin vector triggers a voltage increase or a voltage decrease. In another embodiment for multi-partition voltage correction, a first predetermined value in the worst-case timing margin vector triggers an interrupt in the embedded system to decrease voltages for the current state. On the other hand, a second predetermined value in the worst-case timing margin vector can trigger a read of the timing margin vectors to identify which critical path has a smallest margin, wherein a voltage in the partition associated with that critical path can then be increased for the current state.

Thus, a system for optimizing power for an embedded system can include means for partitioning the embedded system into power domains, means for selecting at least one critical path in each power domain, and means for adjusting voltages of the power domains based on timing margins associated with the critical paths. The means for adjusting can include a time delay circuit and means for comparing an output signal of the critical path to propagated signals associated with stages on the time delay circuit. In one embodiment, at least one power domain includes a plurality of critical paths. In that case, the means for adjusting can include a time delay circuit and means for comparing for each critical path. Each means for comparing can generate a timing margin vector for its associated critical path. The means for adjusting can further include means for generating a combined result vector based on comparing the timing margin vectors.

Thus, one method of optimizing power in an embedded system can include two steps. In a first step, an analysis of a critical path in the embedded system can be analyzed to provide a time integration technique. In a second step, the analysis of multiple critical paths in the embedded system can be performed to provide a physical diversification technique.

The timing feedback module can provide precise, real-time feedback of the current digital circuit performance and timing margin to software. This feedback can advantageously provide optimal settings of voltage for any chip process, frequency, and temperature. Specifically, software can program the optimal settings across each state and partition. Because control of the state transitions can be controlled by hardware, software burden and overhead can be minimized. Notably, this power reduction scheme is compatible and complementary with other commonly used power reduction techniques, e.g. clock gating, low power logic synthesis, low power cell and circuit libraries, and low power communication protocols.

BRIEF DESCRIPTION OF THE INVENTION

DETAILED DESCRIPTION OF THE INVENTION

System Partitioning

Figure 1:
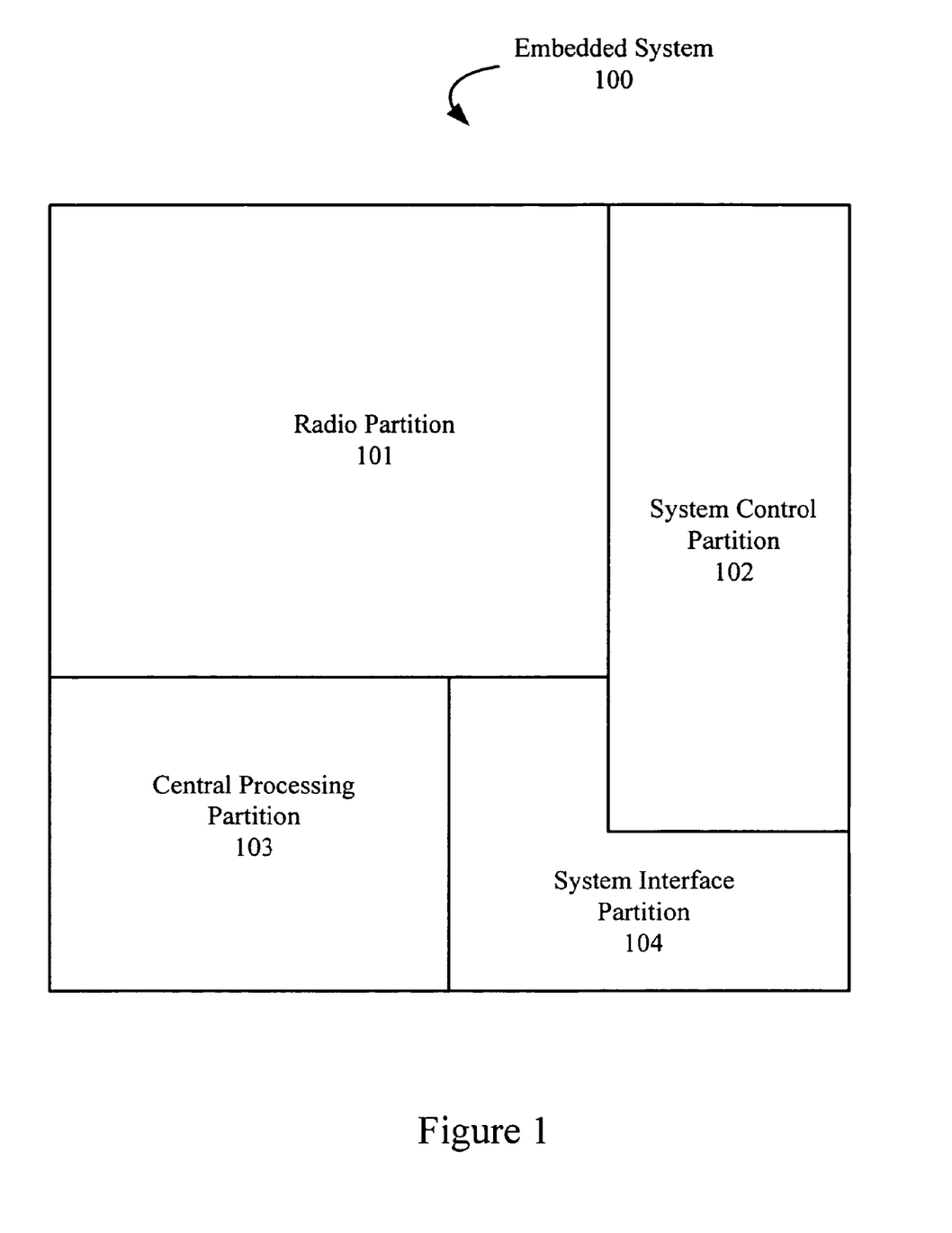
FIG. 1 illustrates an exemplary embedded system that includes multiple power partitions.

A highly integrated, single chip embedded system can include multiple functional areas with diverse voltage and frequency requirements. In one embodiment, the embedded system can be divided into partitions, wherein components within a partition have similar power profiles (e.g. voltage and frequency requirements). For example, FIG. 1 illustrates an exemplary embedded system 100 that includes four partitions: a radio partition 101, a system control partition 102, a central processing partition 103, and a system interface partition 104. Note that other embedded systems may include more or fewer partitions associated with the same or identical functions. In one embodiment, the pads of embedded system 100 connecting to specific components of partitions 101-104 can be characterized as part of those partitions (and thus are not shown separately).

In embedded system 100, radio partition 101 can include functions related to radio operation. For example, radio partition 101 can facilitate analog signal transmission and receipt, analog to digital conversion, digital to analog conversion, and digital signal processing. System control partition 102 can include functions related to the control of voltage, clocks, and system state. Central processing partition 103 can include a general-purpose processor and any support subsystems required by that processor. System interface partition 104 can include functions related to interfacing to other devices, such as an audio and keypad interface. In one embodiment, system interface partition 104 can include an SDIO (discussed in further detail below) developed by the SD Association, a Memory Stick interface developed by Sony Corporation, an SPI (serial peripheral interface) developed by Motorola, Inc., or another interface developed for the transfer of data.

In accordance with one aspect of the invention, the partitioning advantageously allows the power profile of each partition to be optimized independently. In one embodiment, system wide operational requirements can coordinate the partition parameters when inter-partition communication or cooperation is required.

Defining States of Operation

Figure 2:
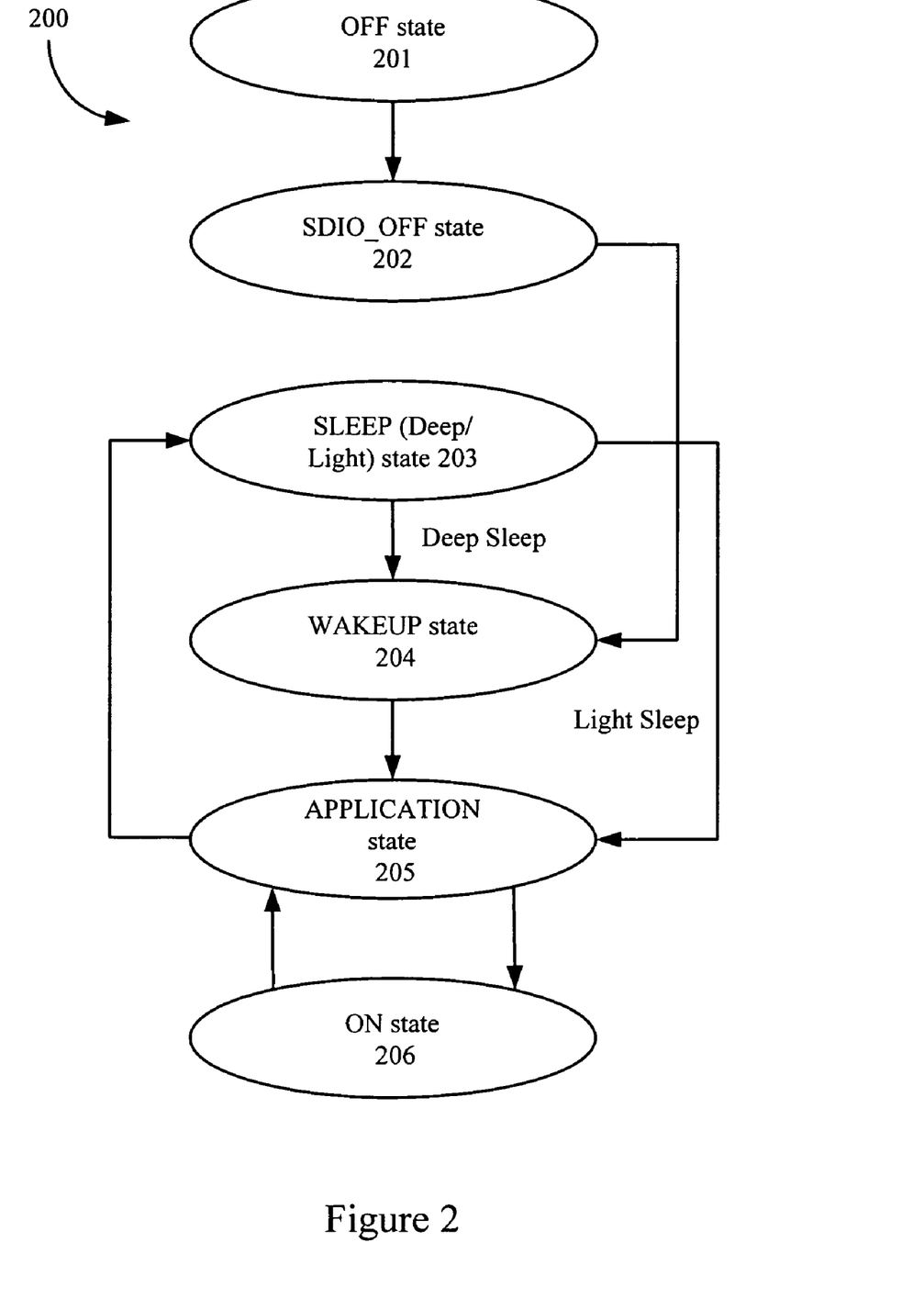
FIG. 2 illustrates an exemplary state machine that includes multiple operational states.

Operational states, i.e. which partitions are operational at what times and the requirements for transition between operational states, can be defined according to system level requirements. FIG. 2 illustrates an exemplary state machine 200 that includes six operational states: OFF, SDIO_OFF, SLEEP, WAKEUP, APPLICATION, and ON.

In the OFF state 201, the system is not being used. The system can transition between the OFF state 201 and the SDIO_OFF state 202, which is an ultra-low power state. Specifically, the SDIO (i.e. Secure Digital Input/Output) refers to a high-speed data I/O with low power consumption for mobile electronic devices (see, the SD Card Specification, Simplified Version of: Part E1, SD Input/Output (SDIO) Card Specification, Version 1.0, October 2001, promulgated by the SD Association). Thus, the SDIO forms an interface that allows communication to and from the IC.

In the SDIO_OFF state 202, the system may retain state but may disable its high-speed oscillator, PLL, or other devices (e.g. voltage/switching regulators). In this embodiment, the system can transition from the SDIO_OFF state 202 to the WAKEUP state 204 in response to an SDIO_ENABLE command, in which the high-speed oscillator can be started.

From the WAKEUP state 204, the system can transition to the APPLICATION state 205. In the APPLICATION state 205, the system can run an application on its central processing unit (CPU), but does not require other specialized functionality to be active. Once in the APPLICATION state 205, the system can transition to the SLEEP state 203 or the ON state 206.

In the SLEEP state 203, the system is in a low power state. In SLEEP state 203, the system may retain state and gate off clocks to high-speed logic. In one embodiment, the SLEEP state 203 does not run the high-speed oscillator, thereby requiring a transition to the WAKEUP state 204. In another embodiment, the SLEEP state 203 can start the high-speed oscillator to accelerate a potential transition to the APPLICATION state 205 (wherein an oscillator may take on the order of 2 msec to settle). Thus, the SLEEP state 203 can include sub-states, e.g. a DEEP SLEEP state that can transition to the WAKEUP state 204 and a LIGHT SLEEP state that can transition to the APPLICATION state 205.

In the ON state 206, the system is fully on and can use any function immediately. In one embodiment, such functions can include a radio function. Once in the ON state 206, the system can transition back to the APPLICATION state 205. Note that any of states 202-206 can directly transition to the OFF state 201 (flow not shown for simplicity).

In accordance with one aspect of the invention, although software can define each transition trigger, system hardware can be used in lieu of software to facilitate the actual transition between states, i.e. implement state machine 200. For example, in the case of a transition between the SLEEP state 203 and the WAKEUP state 204, beacons are received by a WLAN device every 100 msec. Therefore, the WAKEUP event can be an "alarm" that is set by software to go off every 100 msec. However, the enforcement of the transition between the SLEEP state 203 and the WAKEUP state 204, assuming the beacon is directed to that WLAN device, can be performed by hardware.

Note that although seven states (including DEEP and LIGHT SLEEP states) are described in reference to FIG. 2, any number of power states or sub-states can be defined for a system. For example, in one embodiment, an APPLICATION state can be divided into two sub-states: a first sub-state in which the CPU is running and a second sub-state in which the CPU is not running. The number of power states and/or sub-states can be based on the desired voltage/frequency requirements of the embedded system as well as the ability to provide such desired voltage/frequency gradations.

Defining a Power Profile Table

After the software defines the partitions and operational states, the IC can be characterized, thereby allowing a power profile table to be created. Characterization can include testing that IC under various voltage/temperature conditions. The results of this characterization can indicate initial power consumption profiles for the partitions.

Note that an IC may have a significantly different power consumption profile from another functionally equivalent IC. For example, even adjacent ICs on a wafer may have significantly different power profiles. Notably, in accordance with one aspect of the invention, software can determine the optimal power profiles for each IC.

In one embodiment, the initial values of a power profile table can be based on a worst-case IC. However, these values can be subsequently updated and optimized for each IC and each partition within that IC. Specifically, a programmable power profile table allows values to be easily changed. Moreover, a programmable power profile table can enable additional and/or different control parameters to optimize any number of partition and/or system usages.

Figure 3:
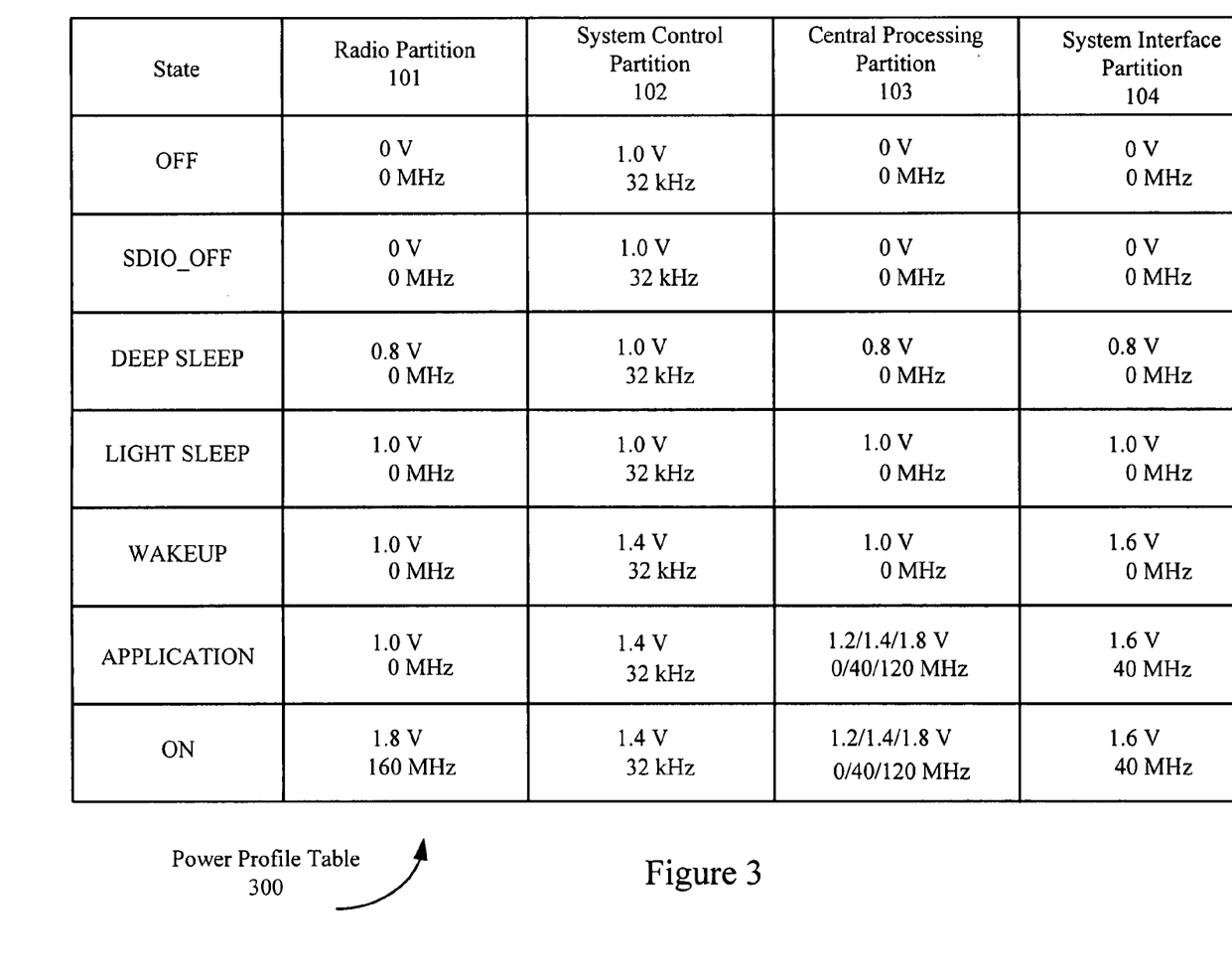
FIG. 3 illustrates an exemplary power profile table.

FIG. 3 illustrates an exemplary power profile table 300. Note that in general, the voltage requirement of each partition increases as the partition transitions from an OFF state to an ON state. For example, radio partition 101 can have a voltage requirement of 0 V for the OFF and SDIO_OFF states, 0.8 V for the DEEP SLEEP state, 1.0 V for the LIGHT SLEEP, WAKEUP, and APPLICATION states, and 1.8 for the ON state. The frequency requirement can differ significantly depending on the partition. For example, radio partition 101 can have 0 MHz for all states except for the ON state, which can have a 160 MHz requirement. In contrast, system control partition 102 can have a frequency requirement of 32 MHz for all states.

In one embodiment, power profile table 300 can include alternative voltage and/or frequency entries for a given system state. The appropriate voltage/frequency entries can be determined based on local conditions. For example, central processing partition 103 can choose an appropriate voltage/frequency combination in either the APPLICATION state or the ON state. In one embodiment, the lowest voltage can be associated with the lowest frequency (i.e. 1.2 V and 0 MHz), the middle voltage can be associated with the middle frequency (i.e. 1.4 V and 40 MHz), and the highest voltage can be associated with the highest frequency (1.8 V and 120 MHz). In other embodiments, other voltage and frequency combinations may be possible. This voltage/frequency selection allows the CPU to halt its clock waiting for an interrupt, to execute at low speed for normal tasks, or to operate at high speed during time critical tasks, all during the same state (i.e. during the APPLICATION state or the ON state).

System Operation

Once the power profile table is defined, the system hardware, which enforces safe state, voltage, and frequency transitions, can be implemented. In one embodiment, a communication protocol (e.g. determined by software engineers) can be mapped to the system states in a way that minimizes overall power. For example, the "uplink polling" feature described in the Voice Over Internet Protocol (VoIP) section of the IEEE 802.11 family of standards can be mapped. After this communication protocol has been implemented, the values of the power profile table can be reprogrammed according to an optimization process.

Figure 4:
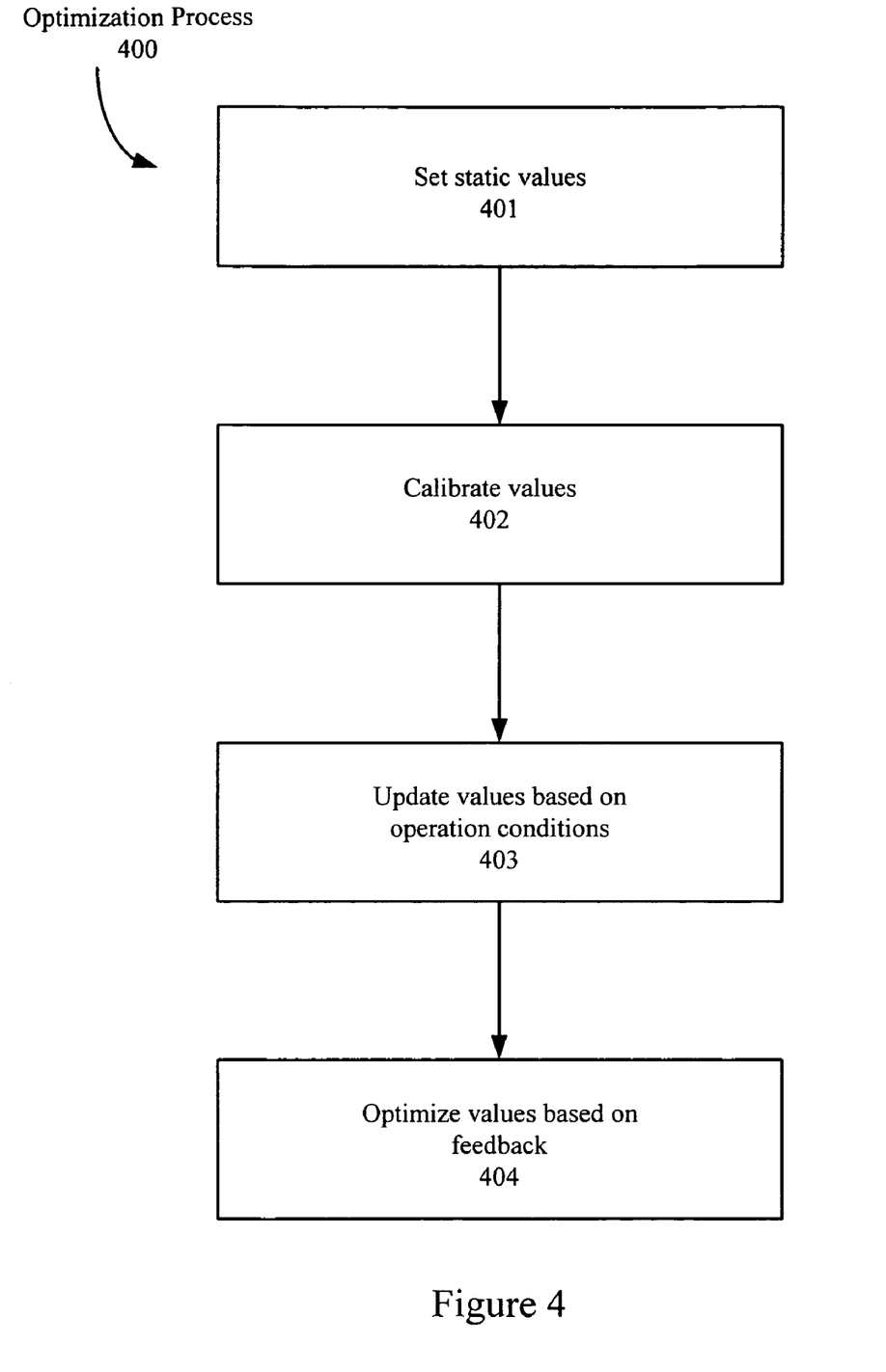
FIG. 4 illustrates an exemplary optimization process.

FIG. 4 illustrates an exemplary optimization process 400. In process 400, static values determined through characterizations can initially be used in the power profile table (block 401). As described previously, these static values can be based on hardware design information and/or observation from laboratory prototypes. In one embodiment, these static values can attempt to optimize baseline operation across all parts, processes, and temperatures.

During manufacturing, embedded systems are often calibrated to adjust radio and other analog circuits. This calibration information, which is unique for each integrated circuit (IC), can be stored in non-volatile memory. Therefore, this calibration data can be used to further optimize the power profile table (block 402).

During system operation, software can periodically gather data on operation conditions that may affect the power profile. For example, changes in temperature or battery level may affect the power profile. Therefore, the values of the power profile table can also be updated using operation conditions (block 403).

Additionally during system operation, software can periodically use timing feedback modules to probe instantaneous system performance. This feedback can also be used to further optimize values in the power profile table (block 404). These timing feedback modules are now described in further detail.

Timing Feedback Modules

Timing feedback modules can be dedicated structures on the IC that attempt to measure device performance. Specifically, timing feedback modules can advantageously measure the actual digital setup time margins of critical paths. This real time setup margin information can be passed to control circuits (implementable in software) that can change the voltage in the power profile table. In one embodiment, a timing feedback module can be implemented with standard cells, thereby allowing the module to fit easily into an established chip design methodology and testing.

Figure 5A:
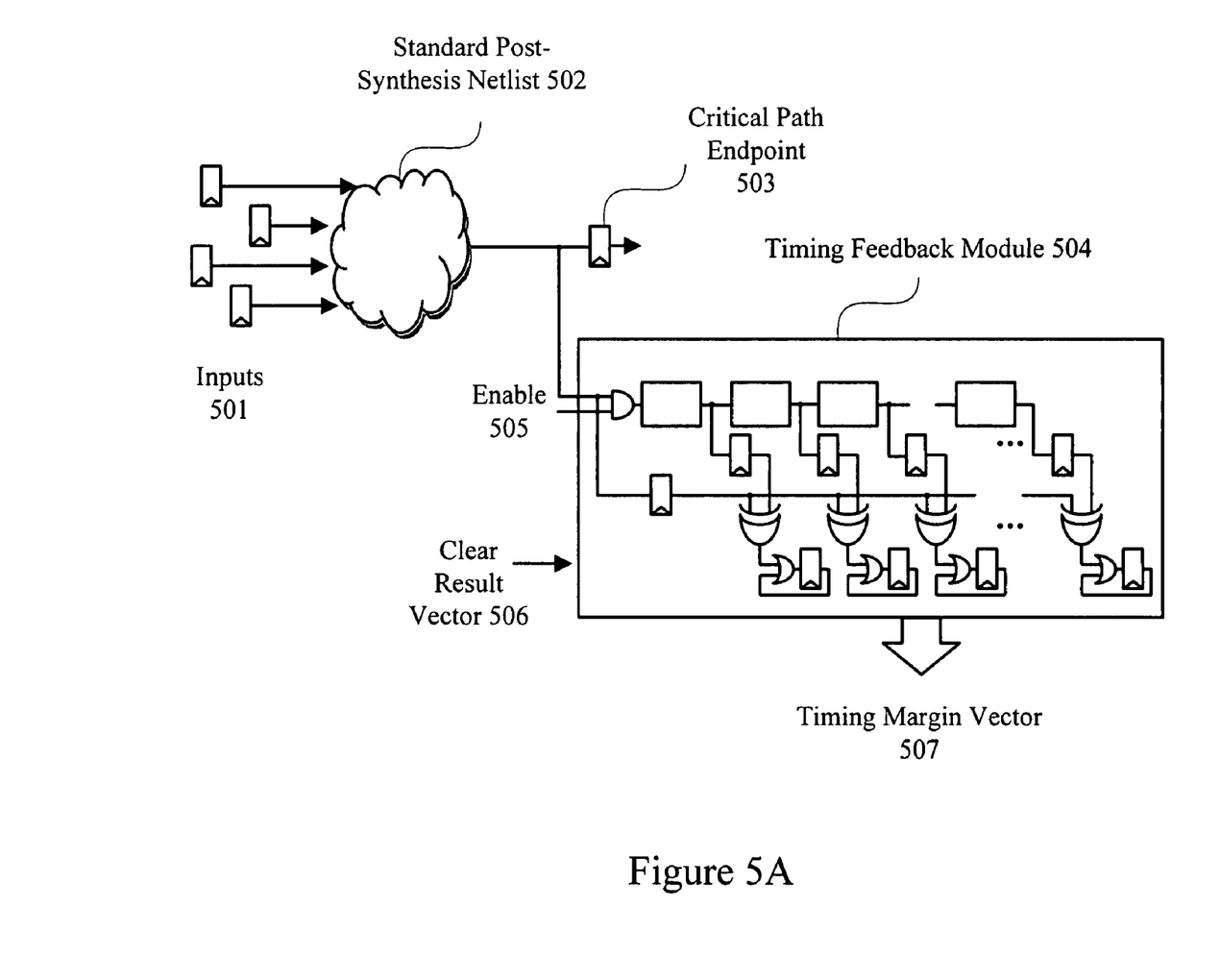
FIG. 5A illustrates an exemplary timing feedback module that can be applied to a critical timing path.

FIG. 5A illustrates an exemplary timing feedback module that can be applied to a critical timing path in a partition. For example, a plurality of inputs 501 can be provided to a standard post-synthesis netlist 502 (e.g. a listing of all of the components and their interconnections that form a partition) to identify a critical path endpoint 503. This critical path endpoint 503 is the endpoint of the longest path (measured using time) in the partition (called a "critical" path herein).

In accordance with one aspect of the invention, a timing feedback module 504 can measure the setup margin of the critical path being physically probed. Notably, if the setup margin of the critical path is optimized, as indicated by a timing margin vector 507 (described in reference to FIG. 5B), then the setup margins for all paths in the partition are conservatively set. This optimization process can be triggered using an enable signal 505 and restarted using a clear result vector 506.

Figure 5B:
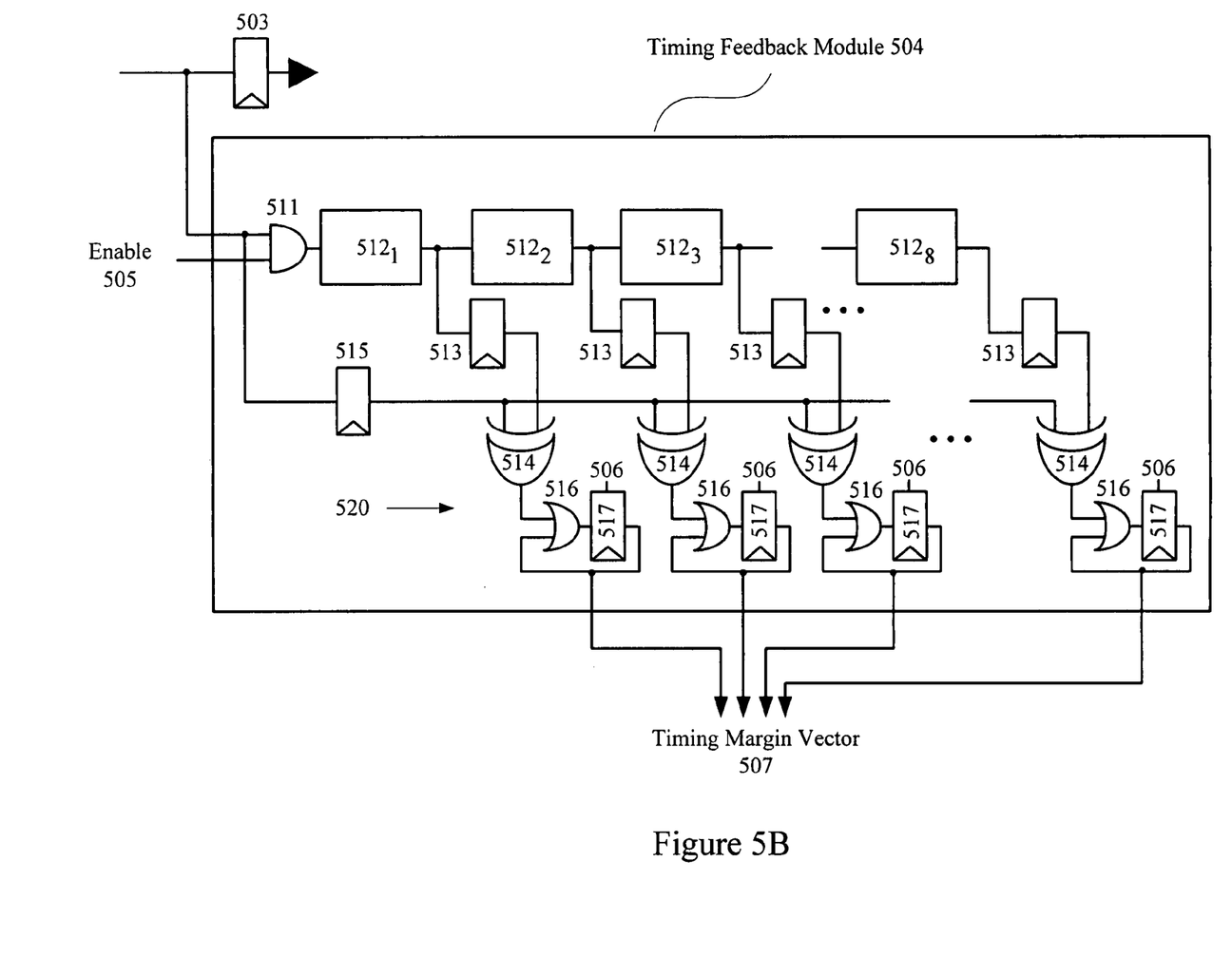
FIG. 5B illustrates an exemplary timing feedback module.

In one embodiment shown in FIG. 5B, timing feedback module 504 can include a chain of delay elements 512 (e.g. buffers)(collectively called a time delay circuit) and flip-flops 513 capturing the outputs of delay elements 512, wherein a delay element 512 and its associated flip-flop 513 form a "stage" of the time delay circuit. In one embodiment, the value of each delay element 512 can be chosen to be a few percent of the target clock cycle, thereby allowing margin measurements to be meaningful relative to cycle time. In another embodiment, the values of delay elements 512 can be increasingly longer for subsequent stages in the time delay circuit. For example, delay elements $512_1$ and $512_2$ could provide a 1× delay, delay elements $512_3$ through $512_7$ could provide a 2× delay, and delay element $512_8$ could provide an 8× delay. This increase in delay can advantageously provide a higher-resolution measurement when the margin is small, as well as a lower-resolution measurement when the margin is relatively large.

In either embodiment, delay elements 512 form a progressively longer path, wherein flip-flops 513 can capture the outputs of delay elements 512. Note that enable signal 505 can be provided to a logic device 511 (e.g. an AND gate or other suitable logic), which can subsequently disable or enable timing feedback module 504. In the case of an AND gate 511, a logic one value for enable signal 505 disables timing feedback module 504 by forcing a constant logic one value (not the value for critical path endpoint 503) to be provided to delay elements 512. In contrast, a logic zero value for enable signal 505 enables timing feedback module 504 by allowing the value for critical path endpoint 503 to be provided to delay elements 512.

In timing feedback module 504, a compare circuit 520 can compare the captured values in flip-flops 513 to the output of the critical path, i.e. a non-delayed value, which is stored in a flip-flop 515. In this embodiment, compare circuit 520 can include exclusive OR (XOR) gates 514, OR gates 516, and flip-flops 506. Note that each stage of the time delay circuit has associated compare circuitry. In the configuration shown in FIG. 5B, if an XOR gate 514 receives different logic inputs (e.g. a "1" and a "0"), then a "miscompare" condition occurs.

Specifically, a miscompare at any stage will cause XOR gate 514 to output a logic one value to its associated OR gate 516. This logic one value forces a logic one to be stored by flip-flop 517, irrespective of the value it stored previously. On the other hand, if the inputs to an XOR gate 514 are identical (i.e. two logic ones or two logic zeros), then XOR gate 514 outputs a logic zero to OR gate 516. Because OR gate 516 also receives the Q output terminal value of its flip-flop 517, a logic zero value provided by OR gate 516 allows flip-flop 517 to retain its present state.

The values stored by flip-flops 517 form timing margin vector 507. Note that the values stored by flip-flops 517 can be reset (e.g. to a logic zero) by clear result vector signal 506, which is generally received from system control partition 102 (FIG. 1).

Timing margin vector 507 represents a timing margin for the current frequency and temperature over the sample period. In timing feedback module 504, the longer the delay, the greater the probability that a miscompare condition will occur. For this reason, a typical pattern for timing margin vector 507 begins with at least one "0" (indicating no miscompare condition) and ends with at least one "1" (indicating a miscompare condition). At some point between the first and last values, the pattern switches from 0s to 1s (e.g. 00001111, 00111111, 00000111, etc).

Note that if all values of timing margin vector 507 are logic zeros (e.g. 00000000), thereby indicating that delay elements 512 have not generated a miscompare condition, then the current voltage is too high and power is being wasted. On the other hand, if all values of timing margin vector 507 with the exception of one value are logic ones (e.g. 01111111), thereby indicating that even a minimal delay generates a miscompare condition, then the current voltage is too low and a timing error could easily occur.

To increase the probability that timing margin vector 507 can capture such a dangerous timing condition, the circuit stimulus over the sample period can include combinations that "exercise" the critical path. In one embodiment, this stimulus can be provided using a directed test. In another embodiment, this stimulus can be provided by extending the sample period over a sufficient operation window (e.g. several seconds to minutes of normal operation).

Figure 6:
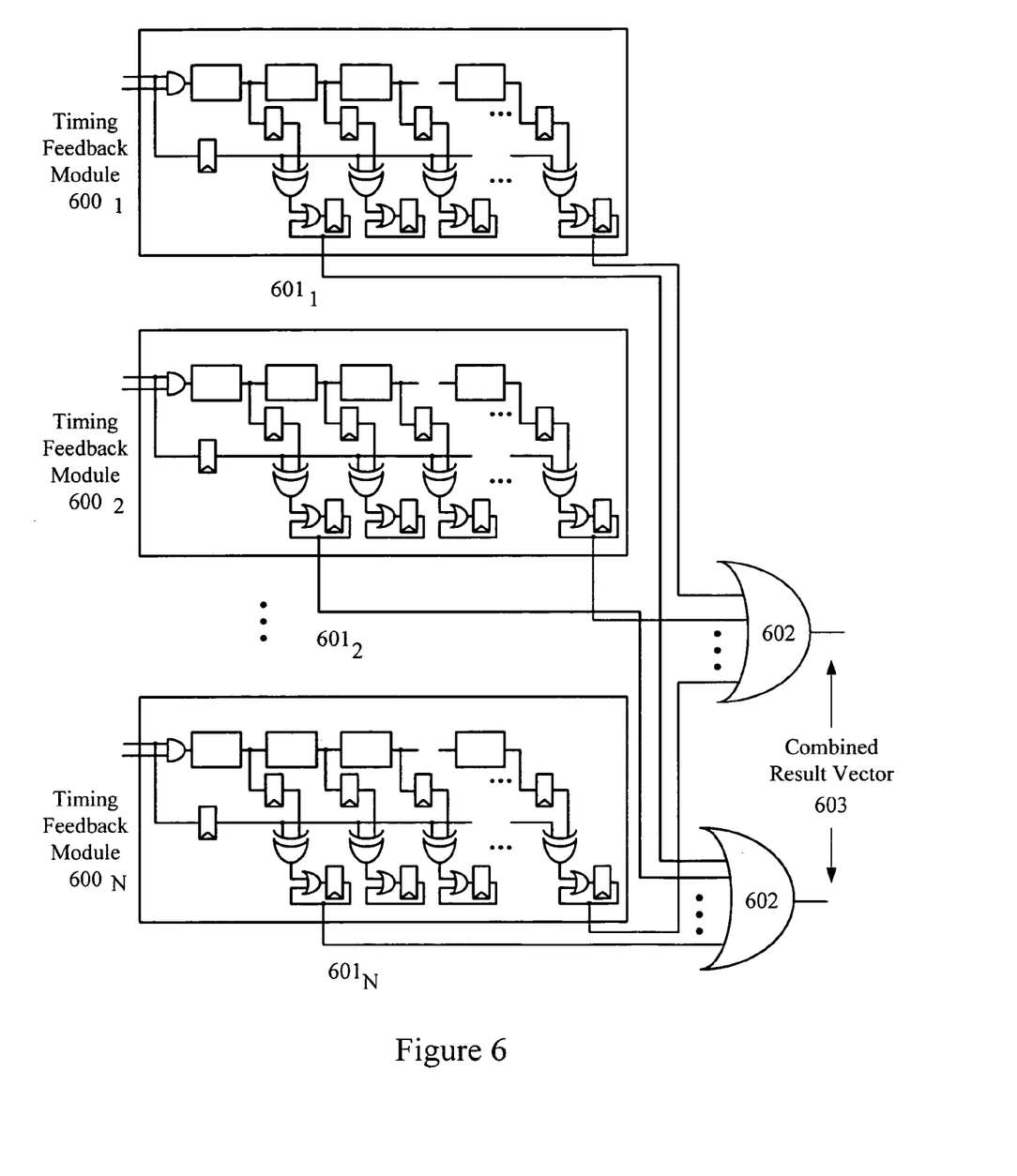
FIG. 6 illustrates how the outputs of multiple timing feedback modules can be compared to generate a combined result vector.

In one embodiment, to increase the chances of obtaining the most conservative timing margin for a partition, multiple timing feedback modules can be connected to multiple critical paths. FIG. 6 illustrates how the outputs of multiple timing feedback modules $600_1$-$600_N$ can be compared to generate a combined result vector. For example, vector portions $601_1$-$601_N$, which are generated by timing feedback modules $601_1$-$601_N$, respectively, can be provided to a logic gate 602 (e.g. an OR gate). This logic gate 602 can advantageously determine if any of vector portions $601_1$-$601_N$ indicate that a miscompare condition has occurred in any of first stages of timing feedback modules $601_1$-$601_N$. In the case of an OR gate, an output of logic one indicates a miscompare.

Notably, vector portions $601_1$-$601_N$ and logic gate 602 can be provided for each stage (see last stage using gray lines). Outputs 603 from each stage form a combined result vector 603. This combined result vector 603 can advantageously indicate a comprehensive timing margin vector, i.e. the worst-case timing margin across all monitored critical paths.

In one embodiment for a chip-wide analysis, critical paths from multiple clock domains and voltage domains (i.e. from different partitions) can be used. The resulting combined result vector can be used to tune voltage levels to optimize settings for a given part, temperature, and state.

Figure 7:
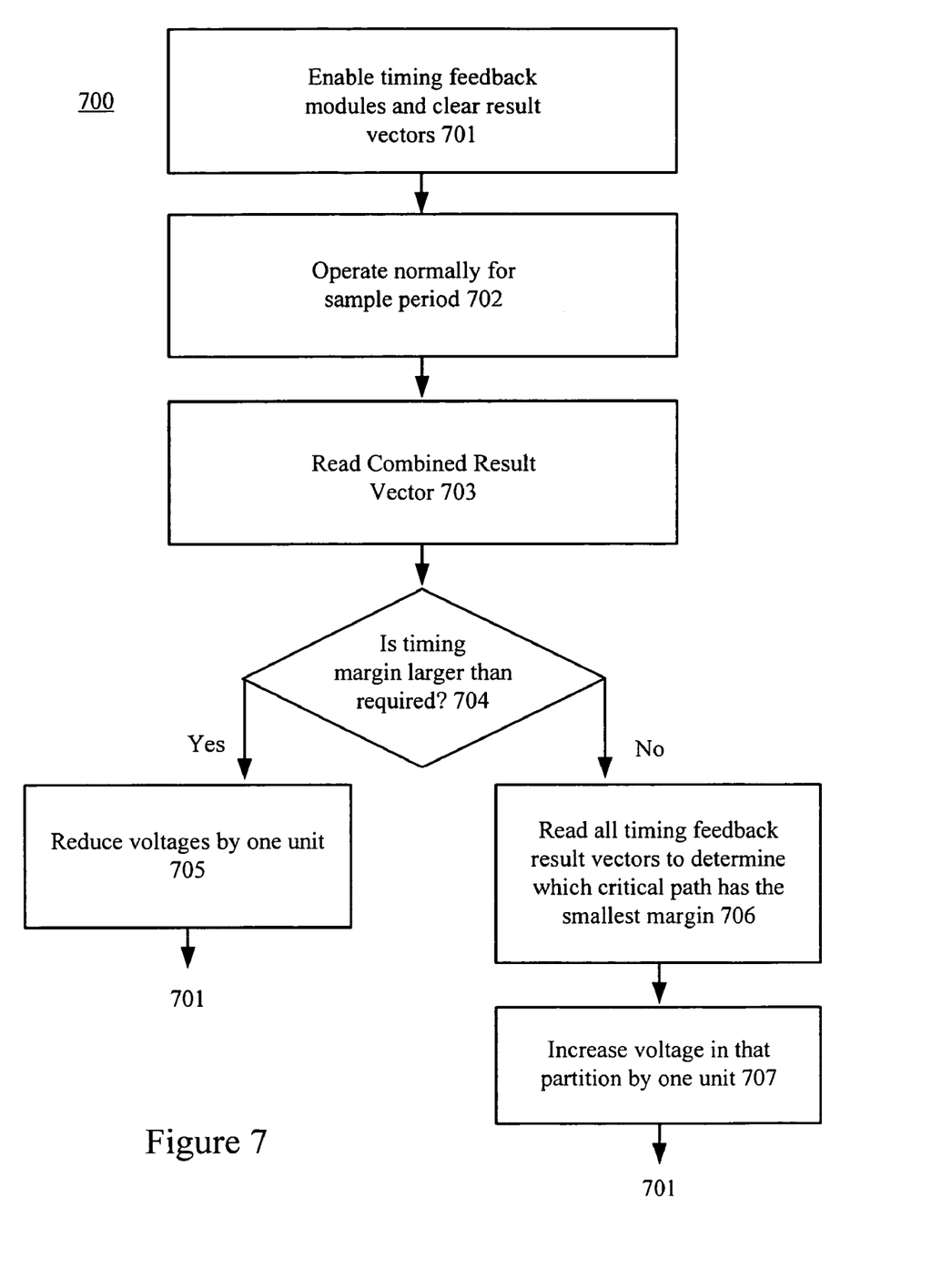
FIG. 7 illustrates an exemplary method for efficiently tuning the voltages across partitions.

FIG. 7 illustrates an exemplary method 700 for efficiently tuning the voltage across multiple partitions on the IC. In step 701, the timing feedback modules can be enabled. In step 702, the system can operate normally for a sample period (e.g. several seconds), thereby allowing enough time for dynamic activity to occur in the selected critical paths. In step 703, the combined result vector for critical paths in different partitions can be read to measure the timing margin. If the timing margin is larger than required (e.g. 00000001), as determined in step 704, then all the voltages in the power profile table for that state can be reduced by one unit (i.e. by the minimal, controllable voltage change (in one embodiment, 1/10 V)) in step 705. On the other hand, if the timing margin is smaller than required (e.g. 01111111), then the timing margin vectors for each partition can be read to determine which critical path has the smallest margin in step 706. Once identified, the voltages in that partition for that state can be increased by one unit in step 707. After performing one of steps 705 and 707, process 700 can be periodically repeated by returning to step 701 (e.g. every 5 minutes, as programmed by software).

Thus, in this embodiment, voltages across the chip can be quickly updated when the combined result vector indicates that all timing margin vectors have a large margin, thereby indicating that power is being wasted and voltages across the chip should be decreased. In contrast, if the combined result vector has a small margin, then any voltage increase can be carefully controlled by identifying only the partition that generated that small margin.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, in one embodiment, to ensure dynamic activity in a critical path, a test routine could be run that is known to exercise that critical path. In another embodiment, the timing margin vector or combined result vector can be programmed to cause an interrupt when the timing margin drops below a programmable threshold. For example, if 8 bits (i.e. bits zero through bit seven) form a vector, then when bit 2 becomes logic one (i.e. 00111111) an interrupt is triggered. This interrupt service routine can quickly adjust voltage (e.g. performed in step 705 of FIG. 7) without polling overhead. This voltage control loop could also be placed in a parameterized hardware state machine.

In yet another embodiment, a power profile table, in addition to voltage and frequency, can also include whether a partition's pads are enabled/disabled. This enabled/disabled status can advantageously prevent from pads from "floating", i.e. drifting to an unknown state, which is undesirable. In other embodiments, a power profile table may only include voltage.

In an embedded system having multiple power partitions, level shifters can be used to facilitate communication between power partitions having different voltages. Level shifters, which are known in the field of chip design, are typically implemented with buffers. Logically, the type and implementation details of such level shifts can be tailored to the desired voltage range for each power partition.

Note that the time delay circuit can include any type of delay elements. For example, as mentioned previously, buffers can be used for the delay elements. In another embodiment, another type of logic gate (e.g. an AND gate) can be used. In yet other embodiments, other types of delay elements (e.g. provided by a standard library) can be used to form the delay line.

In one preferred embodiment, the delay element provides a symmetrical delay (i.e. on the rise and on the fall of a signal change) and is chosen based on the timing constraints of the embedded system. For example, an exemplary delay element chosen for a wireless LAN (WLAN) application could provide a 0.5 nanosecond delay. If a power partition of the WLAN is running at 80 MHz, which equates to 12.5 nanoseconds, then a minimum delay of 0.5 nanosecond provides a suitable granularity. Note that if a 1× delay element provides 0.5 nanosecond delay, then an 8× delay element provides a 4 nanosecond delay. Thus, delay weighting can easily be implemented.

In one embodiment, the timing feedback modules can be characterized as "spare gates", which ensures that their constituent components are not subject to optimization or static timing analysis. Notably, the timing feedback modules can be connected to the identified critical paths after optimization and static timing analysis is performed on the rest of the IC. Because the locations of the critical paths are initially unknown, the timing feedback modules can be physically distributed on the IC, thereby increasing the probability that substantially the same length lines connect the outputs of the critical paths to the inputs of the timing feedback modules. If it is determined that the length of a connecting line is significantly longer than the other connecting lines, then the software can compensate for this length (e.g. by providing a more conservative trigger for voltage reduction).

In one embodiment for implementing the timing feedback module, the smallest flip-flops available can be used, thereby minimizing any capacitive load.

Accordingly, it is intended that the scope of the invention be defined by the following claims and their equivalents.

The invention claimed is:

1. A system for optimizing power for an embedded system, the system comprising:
   means for partitioning a single chip implementation of the embedded system into power domains, wherein at least one power domain includes a plurality of critical paths;
   means for selecting at least one critical path in each power domain; and
   means for adjusting voltages of the power domains based on timing margins associated with the critical paths, wherein the means for adjusting includes:
      a time delay circuit for each critical path;
      means for comparing an output signal of each critical path to propagated signals associated with stages on each time delay circuit, thereby generating a timing margin vector for each critical path; and
      means for generating a combined result vector based on the timing margin vectors,
      wherein the means for comparing includes:
         an XOR gate for receiving the output signal of the critical path and one of the propagated signals; and
         means for storing a designation of whether the output signal and the propagated signal are different values, wherein the designations from the stages form the timing margin vector,
      wherein the means for storing includes:
         an OR gate for receiving an output of the XOR gate; and
         a flip-flop for receiving an output of the OR gate and providing an output to another input terminal of the OR gate.

2. The system of claim 1, wherein the means for generating includes a plurality of OR gates, each OR gate receiving a predetermined order bit from each of the timing margin vectors, wherein the outputs of the plurality of OR gates form the combined result vector.

3. A method of performing time optimization for an embedded system, the method comprising:
   selecting multiple, critical paths in the embedded system;
   generating a timing margin vector for each critical path using a time delay circuit, wherein each bit of the timing margin vector corresponds to a stage of the time delay circuit; and
   determining a worst-case timing margin vector based on the timing margin vectors,
   wherein generating the timing margin vector includes:
      comparing an output signal from a critical path to propagated signals corresponding to stages of the time delay circuit;
      providing a first logic value to the timing margin vector if the output signal and the propagated signal are identical logic values; and
      providing a second logic value to the timing margin vector if the output signal and the propagated signal are not identical logic values; and
   wherein determining the worst-case timing margin vector includes:
      comparing the bits associated with a same stage of the plurality of time delay circuits;
      providing the first logic value to the worst-case timing margin vector if the bits are identical logic values; and
      providing the second logic value to the worst-case timing margin vector if the bits are not identical logic values.

4. The method of claim 3, wherein generating the timing margin vector and determining the worst-case timing margin vector can be performed at least once during run time of the embedded system.

5. The method of claim 3, wherein generating the timing margin vector and determining the worst-case timing margin vector can be performed periodically during run time of the embedded system.

6. The method of claim 3, wherein a predetermined value in the worst-case timing margin vector triggers one of a voltage decrease.

7. The method of claim 3, wherein a predetermined value in the worst-case timing margin vector triggers an interrupt in the embedded system to decrease voltages for a current state.

8. The method of claim 3, wherein a predetermined value in the worst-case timing margin vector triggers a read of the timing margin vectors to identify which critical path has a smallest margin, wherein a voltage of a partition associated with that identified critical path is then increased for a current state.

9. A timing feedback module for generating a timing margin vector, the timing feedback module including:
   a time delay circuit coupled to receive an output of a critical path in an integrated circuit; and
   a compare circuit for comparing the output signal of the critical path to propagated signals associated with stages on the time delay circuit,
   wherein the compare circuit includes:
      a plurality of XOR gates, each XOR gate for receiving the output signal of the critical path and one of the propagated signals;
      a first plurality of OR gates, each OR gate for receiving an output of the XOR gate; and
      a plurality of flip-flops, each flip-flop for receiving an output of the OR gate and providing an output to another input terminal of the OR gate, the output forming a predetermined bit of a timing margin vector.

10. The timing feedback module of claim 9, further including a second plurality of OR gates, each OR gate receiving a predetermined order bit from each of the timing margin vectors, wherein the outputs of the plurality of OR gates form a combined result vector.

* * * * *